(12) United States Patent
Ma et al.

(10) Patent No.: US 11,446,661 B2
(45) Date of Patent: Sep. 20, 2022

(54) MICROFLUIDIC CHANNEL AND PREPARATION METHOD AND OPERATION METHOD THEREOF

(71) Applicant: BOE TECHNOLOGY GROUP CO., LTD., Beijing (CN)

(72) Inventors: Xiaochen Ma, Beijing (CN); Guangcai Yuan, Beijing (CN); Ce Ning, Beijing (CN); Zhengliang Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 380 days.

(21) Appl. No.: 16/643,464

(22) PCT Filed: Mar. 11, 2019

(86) PCT No.: PCT/CN2019/077688
§ 371 (c)(1),
(2) Date: Feb. 28, 2020

(87) PCT Pub. No.: WO2020/181464
PCT Pub. Date: Sep. 17, 2020

(65) Prior Publication Data
US 2021/0229088 A1     Jul. 29, 2021

(51) Int. Cl.
*B01L 3/00*     (2006.01)
*G01N 35/10*     (2006.01)

(52) U.S. Cl.
CPC ..... *B01L 3/50273* (2013.01); *B01L 3/502707* (2013.01); *G01N 35/1016* (2013.01); *B01L 2200/12* (2013.01); *B01L 2300/04* (2013.01); *B01L 2300/16* (2013.01); *B01L 2400/0415* (2013.01)

(58) Field of Classification Search
CPC ............ B01L 2200/12; B01L 2300/04; B01L 2300/0645; B01L 2300/0816; B01L 2300/16; B01L 2400/0415; B01L 3/502707; B01L 3/502715; B01L 3/50273; G01N 35/1016
See application file for complete search history.

(56) References Cited

U.S. PATENT DOCUMENTS

| | | | |
|---|---|---|---|
| 2005/0053484 A1 | 3/2005 | Hirota et al. | |
| 2005/0064581 A1 | 3/2005 | Manalis | |
| 2009/0181441 A1 | 7/2009 | Jin et al. | |
| 2009/0215158 A1 | 8/2009 | Sekizawa et al. | |

FOREIGN PATENT DOCUMENTS

| CN | 1646903 A | 7/2005 | |
|---|---|---|---|
| CN | 101263392 A | 9/2008 | |
| CN | 102650512 A | 8/2012 | |
| CN | 102759555 A | * 10/2012 | ......... G01N 27/4073 |
| CN | 106687804 A | 5/2017 | |
| CN | 109160482 A | 1/2019 | |
| WO | 2007001410 A2 | 1/2007 | |

* cited by examiner

*Primary Examiner* — Jennifer Wecker

(57) ABSTRACT

A microfluidic channel and a preparation method and an operation method thereof. The microfluidic channel includes: a channel structure, including a channel for a liquid sample to flow through and a channel wall surrounding the channel. The channel wall includes an electrolyte layer made of an electrolyte material; and a control electrode layer, at a side of the electrolyte layer away from the channel. The control electrode layer overlaps with the electrolyte layer with respect to the channel.

20 Claims, 8 Drawing Sheets

MICROFLUIDIC CHANNEL AND PREPARATION METHOD AND OPERATION METHOD THEREOF

TECHNICAL FIELD

Embodiments of the present disclosure relate to a microfluidic channel and a preparation method and an operation method thereof.

BACKGROUND

Microfluidics and nanofluidics (Microfluidics and Nanofluidics) is an emerging frontier interdiscipline subject involving numerous technical fields, such as physics, chemistry, engineering, materials, biology, or the like. In recent years, the microfluidics and nanofluidics has been developed rapidly, and especially its numerous potential advantages and broad application prospects have attracted great attention from the world's academic and industrial circles. A microfluidic and nanofluidic channel is an indispensable component in a microfluidic and nanofluidic device, such as a microfluidic and nanofluidic chip, a sensor, or the like.

SUMMARY

At least one embodiment of the present disclosure provides a microfluidic channel, comprising:
a channel structure, comprising a channel for a liquid sample to flow through and a channel wall surrounding the channel, wherein the channel wall comprises an electrolyte layer made of an electrolyte material; and
a control electrode layer, at a side of the electrolyte layer away from the channel and overlapping with the electrolyte layer with respect to the channel.

For example, in the microfluidic channel according to some embodiments of the present disclosure, the electrolyte layer is exposed in the channel to be allowed to be in contact with the liquid sample in an operation.

For example, in the microfluidic channel according to some embodiments of the present disclosure, the electrolyte layer surrounds a part of the channel.

For example, in the microfluidic channel according to some embodiments of the present disclosure, the channel wall further comprises a first wall layer, the first wall layer is exposed in the channel to be allowed to be in contact with the liquid sample in an operation, and a material of the first wall layer is different from the electrolyte material of the electrolyte layer.

For example, in the microfluidic channel according to some embodiments of the present disclosure, the channel wall further comprises a second wall layer, the electrolyte layer is at a side of the second wall layer away from the channel, and a material of the second wall layer is different from the electrolyte material of the electrolyte layer.

For example, the microfluidic channel according to some embodiments of the present disclosure further comprises a base substrate, wherein the control electrode layer is on the base substrate, and the channel structure is at a side of the control electrode layer away from the base substrate.

For example, in the microfluidic channel according to some embodiments of the present disclosure, the control electrode layer comprises a first electrode part and a second electrode part at opposite sides of the channel.

For example, in the microfluidic channel according to some embodiments of the present disclosure, the electrolyte layer comprises a first part on the first electrode part and a second part on the second electrode part, and the first part is in contact with the second part to define the channel therebetween.

For example, the microfluidic channel according to some embodiments of the present disclosure further comprises a cover plate.
wherein the cover plate is at a side of the channel structure to partially define the channel.

For example, in the microfluidic channel according to some embodiments of the present disclosure, the electrolyte material comprises are inorganic electrolyte material or a polymer electrolyte material.

For example, in the microfluidic channel according to some embodiments of the present disclosure, the electrolyte material is liquid, and the channel structure comprises a hole structure configured to be allowed to accommodate the electrolyte material in an operation to form the electrolyte layer.

At least one embodiment of the present disclosure provides a method of preparing a microfluidic channel, comprising:
forming a control electrode layer; and
forming a channel structure on the control electrode layer, wherein the channel structure comprises a channel for a liquid sample to flow and a channel wall comprising an electrolyte layer made of an electrolyte material, and the control electrode layer is at a side of the electrolyte layer away from the channel and overlaps with the electrolyte layer with respect to the channel.

For example, in the method according to some embodiments of the present disclosure, the electrolyte layer is exposed in the channel to be allowed to be in contact with the liquid sample in an operation.

For example, in the method according to some embodiments of the present disclosure, the electrolyte layer surrounds the channel.

For example, in the method according to some embodiments of the present disclosure, the forming the control electrode layer comprises:
  forming a first electrode part and a second electrode part which are spaced apart,
  wherein the first and second electrode parts are at opposite sides of the channel; the forming the channel structure on the control electrode layer comprises:
  forming the electrolyte layer on the first and second electrode parts, and enabling a first part of the electrolyte layer on the first electrode part to be in contact with a second part of the electrolyte layer on the second electrode layer to define the channel.

For example, in the method according to some embodiments of the present disclosure, wherein the forming the channel structure on the control electrode layer comprises:
forming the electrolyte layer on the control electrode layer;
forming a second wall layer on the electrolyte layer, wherein a material of the second wall layer is different from the electrolyte material of the electrolyte layer; and forming the channel in the second wall layer.

For example, in the method according to some embodiments of the present disclosure further comprises:
providing a base substrate,
wherein the control electrode layer is formed on the base substrate, and the channel structure is formed on the control electrode layer.

For example, in the method according to some embodiments of the present disclosure, the electrolyte material comprises a solid inorganic electrolyte material or a solid polymer electrolyte material.

For example, in the method according to some embodiments of the present disclosure, the electrolyte material is liquid, and the method further comprises:

forming a hole structure in the channel wall, and accommodating the electrolyte material in the hole structure to obtain the electrolyte layer.

At least one embodiment of the present disclosure provides an operation method of any one of the above-mentioned microfluidic channels, comprising: providing an electric signal to the control electrode layer to control the liquid sample flowing in the channel.

At least one embodiment of the present disclosure provides a microfluidic device comprising any one of the above-mentioned microfluidic channels.

At least one embodiment of the present disclosure further provides a method of preparing a microfluidic device, comprising:

forming a control electrode layer; and
forming a channel structure on the control electrode layer, wherein the channel structure comprises a channel for a liquid sample to flow and a channel wall comprising an electrolyte layer made of an electrolyte material, and the control electrode layer is at a side of the electrolyte layer away from the channel and overlaps with the electrolyte layer with respect to the channel.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

Figure 1A:
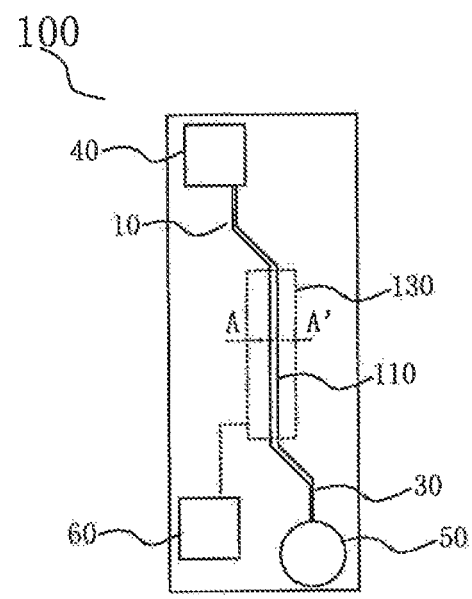
FIG. 1A is a schematic top view of a microfluidic channel according to at least one embodiment of the present disclosure.

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

To keep the following description of the embodiments of the present disclosure clear and concise, the present disclosure omits detailed descriptions of known functions and known components.

The term "electrolyte material" used in the present disclosure refers to a material with an ionic conductivity but without an electronic conductivity, and ions in the electrolyte material may be movable when driven by an applied electric field.

In microfluidic and nanofluidic devices, charges at an inner wall of a channel will affect the charge distribution of molecules of fluid in the channel. Currently, the device based on a nanofluidic channel mainly relies on surface charges for surface modification and applied electric field to generate an electric field for surface charges. However, since the surface charges provide a limited modification amount, and the electric field generated by an applied voltage has a limited effect on the charge distribution in the channel, an electrostatic force in a solution often has a small action range, i.e., the Debye length is small, and in addition, a high voltage is often required to improve the influence of the electrostatic force on the charge distribution in the channel. For a wide channel and a low applied voltage, a fluid control effect of the nanofluidic device is greatly reduced.

At least one embodiment of the present disclosure provides a microfluidic channel including a channel structure and a control electrode layer. The channel structure includes a channel for a liquid sample to flow through and a channel wall surrounding the channel and including a first material layer made of an electrolyte material, and the control electrode layer is located at a side of the first material layer away from the channel, and overlaps with the first material layer with respect to the channel. Since the first material layer is made of the electrolyte material in the embodiments of the present disclosure, the first material layer is also referred to as an electrolyte layer hereinafter.

Furthermore, it should be understood that the microfluidic channel according to the present disclosure includes the channel having a dimension in at least one direction ranging from about 1 nm to about 1000 μm, for example, from about 1 nm to about 50 nm, from about 50 nm to about 100 nm, from about 100 nm to about 1 μm, from about 1 μm to about 10 μm, from about 10 μm to about 100 μm, from about 100 μm to about 200 μm, from about 200 μm to about 400 μm, from about 400 μm to about 600 μm, from about 600 μm to about 800 μm and from about 800 μm to about 1000 μm. For example, the above-mentioned at least one direction may refer to a height, width, diameter, or the like, of a cross section of the channel. When the channel wall (including a bottom or top of the channel) is irregular or curved, the terms "height" and "width" may also involve an average height and an average width, respectively. The microfluidic channel may have any selected sectional shape, for example, a U shape, D shape, rectangle, triangle, oval, quasi-oval, circle, semicircle, square, trapezoid, pentagon, hexagon, etc. Optionally, the microfluidic channel has an irregular sectional shape. A sectional geometry of the microfluidic channel may be constant or vary along a length of the microfluidic channel. Furthermore, the microfluidic channel may have any selected arrangement or structure, including a linear structure, a non-linear structure, a merged structure, a branched structure, a loop structure, twisted structure, stepped structure, etc. Optionally, the microfluidic channel may have one or more open ends. Optionally, the microfluidic channel may have one or more closed ends. Optionally, the microfluidic channel has a closed wall structure. Optionally, the microfluidic channel has a partially open wall structure. Optionally, the microfluidic channel has a fully open wall structure, for example, a micro-groove.

FIG. 1A shows a schematic top view of a microfluidic channel 100 according to at least one exemplary embodiment of the present disclosure. As shown in FIG. 1A, the microfluidic channel 100 includes a channel inlet 10, a channel outlet 30 and a channel 110 located between the channel inlet 10 and the channel outlet 30 and connecting the channel inlet 10 with the channel outlet 30. The channel inlet 10 is in fluid communication with a liquid injector 40 to receive the liquid sample therefrom, and the liquid, sample may flow in the channel 110. A liquid accommodation portion 50 is in fluid communication with the channel outlet 30 and will accommodate the liquid sample flowing out of the channel outlet 30. Furthermore, the microfluidic channel 100 further includes a controller 60 for controlling an operation performed on the liquid sample in the channel 110.

Figure 1B:
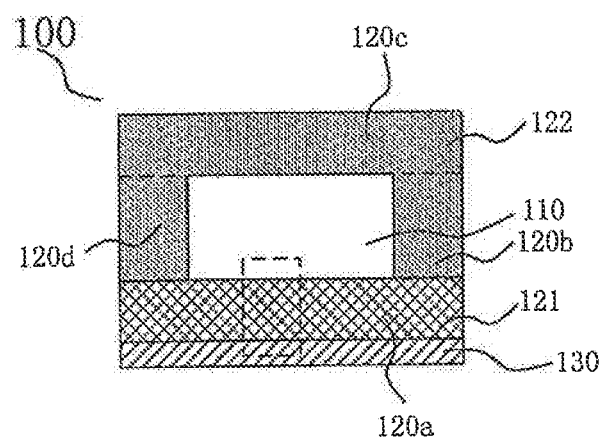
FIG. 1B is a sectional view taken along line A-A' in FIG. 1A.

For example, the controller 60 may be configured to control the application of an electric signal, or the like, to a control electrode layer, FIG. 1B is a sectional view taken along line A-A' in FIG. 1A. As shown in FIG. 1B, the microfluidic channel 100 according to at least one embodiment of the present disclosure includes a channel structure including the channel 110 for the liquid sample to flow and a channel wall surrounding the channel 110. Exemplarily, in FIG. 1B, the channel wall surrounding the channel 110 includes a first channel wall part 120a, a second channel wall part 120b, a third channel wall part 120c and a fourth channel wall part 120d.

It should be understood that the shape of the channel 110 in FIG. 1B is only exemplary, and in the case where the channel 110 has other shapes, the channel wall surrounding the channel 110 may include more or fewer channel wall parts.

Furthermore, it should also be understood that in the present disclosure, for the convenience of description, the channel wall is described as including the first, second, third and fourth channel wall parts 120a, 120b, 120e, 120d. However, in practice, the above-mentioned plural channel wall parts may be formed integrally.

Exemplarily, in the present embodiment, the first channel wall part 120a includes an electrolyte layer 121 made of an electrolyte material and exposed in the channel 110, and the electrolyte layer 121 is allowed to be in contact with the liquid sample in the channel 100 in an operation. The second, third and fourth channel wall parts 120b, 120c, 120d include a second material layer 122 which is also exposed in the channel 110 and thus is allowed to be in contact with the liquid sample in the channel 110 in an operation. The second material layer 122 is an example of a first wall layer in the embodiments of the present disclosure. The material of the second material layer 122 is different from the electrolyte material of the electrolyte layer 121, for example, a non-electrolyte material. In some embodiments, part of the second, third and fourth channel wall parts 120b, 120c and 120d includes the second material layers 122, and the remaining part includes other materials, which is not limited in the embodiments of the present disclosure.

As shown in FIG. 1B, the microfluidic channel 100 further includes a control electrode layer 130 located at a side of the electrolyte layer 121 away from the channel 110. With respect to the channel 110, the control electrode layer 120 overlaps with the electrolyte layer. In other words, a projection of the channel 110 on the control electrode layer 130 overlaps with a projection of the electrolyte layer on the control electrode layer 130. For example, referring to FIG. 1A, the control electrode layer 130 is configured as a strip-shaped electrode with an extension direction the same as that of the channel 110 at least partially, or in other examples, with the extension direction intersecting with that of the channel 110, so that the control electrode layer 130 acts on a part of the channel 110 overlapping with the control electrode layer 130.

The control electrode layer 130 is coupled to the controller 60 or a control circuit. In an operation, the controller 50 or control circuit provides a voltage signal to the control electrode layer 130, so as to control the liquid sample flowing in the channel 110, for example, concentration, filtering, separation, or the like, of the liquid sample. The control electrode layer 130 may be made of any proper material, for example, a simple metal, an alloy, an electrically conductive organic material (such as polyimide, or the like), an electrically conductive oxide (such as indium tin oxide (ITO), indium zinc oxide (IZO), or the like), or the like. In some embodiments, an insulation layer may also be formed outside the control electrode layer 130, so as to protect and prevent the control electrode layer 130 from being polluted or damaged. A specific configuration and type of the controller 60 or control circuit are not limited in the embodiments of the present disclosure.

It should be understood that although FIG. 1B shows that the electrolyte layer 121 and the control electrode layer 130 are only located at a lower side of the channel 120, in other embodiments, the electrolyte layer 121 and the control electrode layer 130 may also be located at one or more other positions of the channel 120. For example, at least one of the second, third and fourth channel wall parts 120b, 120c, 120d may also include the electrolyte layer 121 and the control electrode layer 130, which is not limited in the embodiments of the present disclosure.

In the electrolyte layer 121 made of the electrolyte material, movable ions may be driven by a small voltage. In the case where the electric signal is applied to the control electrode layer 130, two ionic layers having different charges and attracted by each other, i.e., an electric double layer, are formed at a side of the electrolyte layer 121 close to the control electrode layer 130 and a side of the electrolyte layer 121 away from the control electrode layer 130. Since the distance between the two ionic layers in the electric double layer is small, the formed electric double layer has a large capacitance, so that a large number of charged ions may be attracted or repelled at a surface of the electrolyte layer 121, thereby changing the ion distribution near the surface of the electrolyte layer 121 and achieving an enhanced fluid control effect. Furthermore, since a distance between the ions gathered in the electric double layer and the liquid sample is much less than that between the control electrode layer 130 and the liquid sample, and an intensity of an electric field is attenuated with a square of the distance, the ions gathered in the electric double layer have a higher control capability and a higher-precision sensing capability for the liquid sample in the channel 110.

Figure 2:
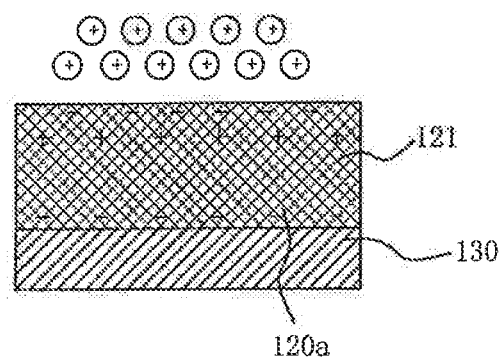
FIG. 2 is an enlarged view of a part indicated by a dotted box in FIG. 1

FIG. 2 is an enlarged view of a part indicated by a dotted box in FIG. 1B. The following description will be made by taking a positive voltage being applied to the control electrode layer 130 as an example. In an operation, in the case where the positive voltage is applied to the control electrode layer 130, anions (i.e., ions or ionic groups with negative charges) in the electrolyte layer 121 are gathered at the side of the electrolyte layer 121 close to the control electrode layer 130 under the action of the positive voltage of the control electrode layer 130, and cations (i.e., ions or ionic groups with positive charges) in the electrolyte layer 121 are gathered at the side of the electrolyte layer 121 away from the control electrode layer 130 under the action of the positive voltage of the control electrode layer 130, thereby forming the electric double layer.

As shown in FIG. 2, in the case where the liquid sample in the channel 110 has charges which may move freely or the liquid sample is polar liquid, negative surface charges will be gathered at a side of the electrolyte layer 121 close to the channel 110 (i.e., the side of the electrolyte layer 121 away from the control electrode layer 130). Due to the effect of the positive voltage applied to the control electrode layer 130, the cations gathered at the side of the electrolyte layer 121 away from the control electrode layer 130 are much more than the negative surface charges, positive charges exist at the surface of the electrolyte layer 121 corning into contact with the liquid sample as a whole, and the cations gathered at the side of the electrolyte layer 121 away from the control electrode layer 130 will repel positive charges or polar liquid molecules in the liquid sample in the channel 110, thus changing charge distribution in the liquid sample in the channel 110 and changing a physical property (for example, viscosity) of the fluid correspondingly, thereby manipulating the liquid sample, for example, achieving closing the channel; correspondingly, when the positive voltage signal at the control electrode layer 130 is stopped, the channel may be opened, or the like.

Furthermore, in the case where the electric signal with a constant voltage is applied to the control electrode layer 130, the charge distribution in the liquid sample in the channel 110 may be changed by adjusting an ion density in the electrolyte material of the electrolyte layer 121.

Since a low electric field intensity is required to drive the movable charged ions in the electrolyte material of the electrolyte layer 121, by applying a small voltage to the control electrode layer 130, the movable charged ions in the electrolyte material of the electrolyte layer 121 may be gathered at the side close to the channel 110, and the electric double layer may be formed in the electrolyte layer 121. Since the movable charged ions gathered at the side of the electrolyte layer 121 close to the channel 110 are closer to the charges in the liquid sample in the channel 110 than the control electrode layer 130, and the intensity of the electric field is inversely proportional to the square of the distance, the intensity of the electric field acting on the charges in the liquid sample in the channel 110 may be increased greatly, thereby reducing the voltage of the electric signal required to realize fluid control and applied to the control electrode layer 130, and improving the effect of the voltage on the charge distribution in the liquid sample in the channel 110. Furthermore, since the movable charged ions gathered at the side of the electrolyte layer 121 close to the channel 110 act on the charges or polar molecules in the liquid sample in the channel 110 closely, the fluid control effect and a detection and sensing precision may be improved.

In the microfluidic channel according to the embodiments of the present disclosure, the arrangement of the electrolyte material in the channel wall may reduce the voltage of the electric signal required to realize the fluid control and applied to the control electrode layer, and since the charge distribution in the liquid sample in the channel may be affected closely, the fluid control effect and the detection and sensing precision may be improved.

Figure 3:
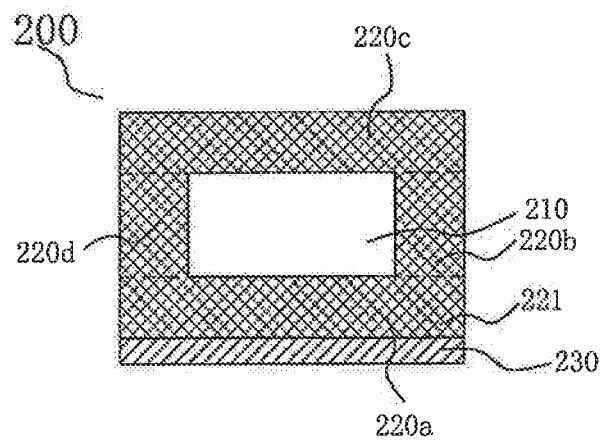
FIG. 3 is a schematic structural diagram of a microfluidic channel according to at least one embodiment of the present disclosure.

In some embodiments, the electrolyte layer may surround the channel and is exposed in the channel, and thus the electrolyte layer is allowed to be in contact with the liquid sample in the channel in an operation. As shown in FIG. 3, a microfluidic channel 200 according to at least one embodiment of the present disclosure is substantially the same as the above-mentioned microfluidic channel 100, except that a first channel wall part 220a, a second channel wall part 220b, a third channel wall part 220c and a fourth channel wall part 220d of a channel wall surrounding a channel 210 in the microfluidic channel 200 each include an electrolyte layer 221 which is exposed in the channel 210 and thus is allowed to be in contact with a liquid sample in the channel 210 in an operation. The channel 210, the first, second, third and fourth channel wall parts 220a, 220h, 220c, 220d, the electrolyte layer 221 and a control electrode layer 230 in FIG. 3 are substantially the same as the channel 110, the first, second, third and fourth channel wall parts 120a, 1201, 120c, 120d, the electrolyte layer 121 and the control electrode layer 130 described above, and therefore will not be repeated in the present disclosure. Or, for this situation, in another embodiment, the control electrode layer 130 may also be provided at more side surfaces of the channel 110, for example, may overlap with two or more (for example, all) channel wall parts, thus better controlling the fluid in the channel 110.

By including the electrolyte layer in each of the first to fourth channel wall parts, the control electrode layer may be arranged conveniently, and a design difficulty is reduced.

In some embodiments, the electrolyte layer may surround at least a part of a length of the channel, the channel wall further includes a second material layer, and both the electrolyte layer and the second material layer are exposed in the channel and thus allowed to be in contact with the liquid sample in the channel in an operation. A material of the second material layer is different from an electrolyte material of the electrolyte layer. For example, the electrolyte layer may surround the entire length or a part of the length of the channel. The second material layer is an example of the first wall layer in the embodiments of the present disclosure.

Figure 4:
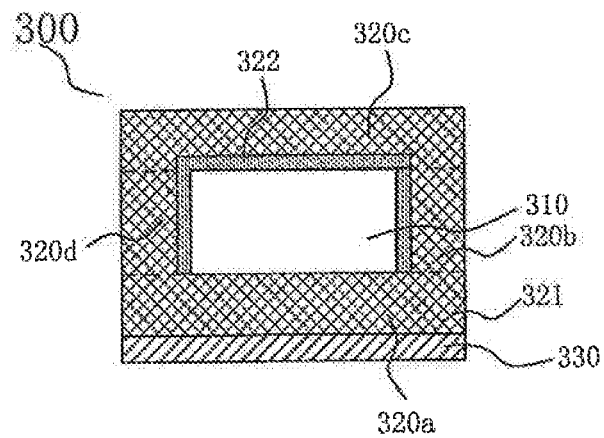
FIG. 4 is a schematic structural diagram of a microfluidic channel according to at least one embodiment of the present disclosure.

As shown in FIG. 4, a microfluidic channel 300 according to at least one embodiment of the present disclosure is substantially the same as the above-mentioned microfluidic channel 200, except that a second channel wall part 320b, a third channel wall part 320c and a fourth channel wall part 320d of a channel wall surrounding a channel 310 in the microfluidic channel 300 each include a second material layer 322. Although in the exemplary embodiment shown in FIG. 4, the second, third and fourth channel wall parts 320b, 320c, 320d of the channel wall surrounding the channel 310 in the microfluidic channel 300 each include the second material layer 322, in other embodiments, one or more of the second, third and fourth channel wall parts 320b, 320c, 320d may include the second material layer 322, which is not limited in the embodiments of the present disclosure. The channel 310, the first, second, third and fourth channel wall parts 320a, 320b, 320c, 320d, an electrolyte layer 321, the second material layer 322 and a control electrode layer 330 in FIG. 4 are substantially the same as the channel 110, the first, second, third and fourth channel wall parts 120a, 120b, 120c, 120d, the electrolyte layer 121, the second material layer 122 and the control electrode layer 130 described above, and therefore will not be repeated in the present disclosure.

In some embodiments, the channel wall may further include a third material layer, the electrolyte layer is located at a side of the third material layer away from the channel, and a material of the third material layer is different from an electrolyte material of the electrolyte layer. The third material layer is an example of a second wall layer in the embodiments of the present disclosure.

Figure 5:
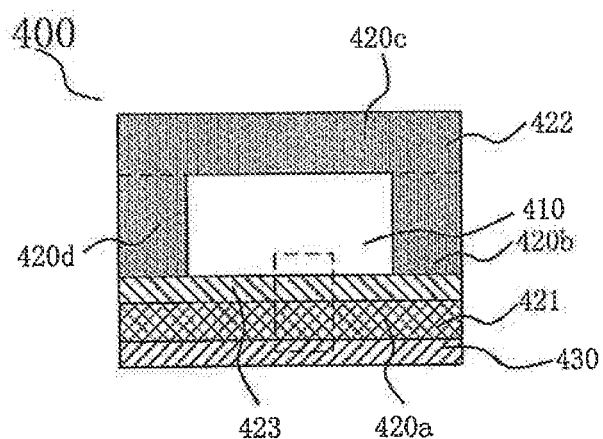
FIG. 5 is a schematic structural diagram of a microfluidic channel according to at least one embodiment of the present disclosure.

As shown in FIG. 5, a microfluidic channel 400 according to at least one embodiment of the present disclosure is substantially the same as the above-mentioned microfluidic channel 100, except that a first channel wall part 420a of a channel wall surrounding a channel 410 in the microfluidic channel 400 further includes a third material layer 423, and an electrolyte layer 421 is located at a side of the third material layer 423 away from the channel 410. A material of the third material layer 423 is different from an electrolyte material of the electrolyte layer 421. Due to the third material layer 423, the electrolyte layer 421 is not exposed in the channel 410 and thus will not be in contact with a liquid sample in the channel 410 in an operation. In some embodiments, one or more layers may further exist between the electrolyte layer 421 and the third material layer 423 and at a side of the third material layer 423 away from the electrolyte layer 421, which is not limited in the embodiment of the present disclosure. Although in the exemplary embodiment shown in FIG. 5, a second channel wall part 420b, a third channel wall part 420c and a fourth channel wall part 420d of the channel wall surrounding the channel 410 in the microfluidic channel 400 include only a second material layer 422, in other embodiments, other parts of the channel wall surrounding the channel 410 in the microfluidic channel 400 may include the electrolyte layer 421, the second material layer 422, the third material layer 423 or combinations thereof; which is not limited in the embodiments of the present disclosure. The channel 410, the first, second, third and fourth channel wall parts 420a, 420b, 420c, 420d, the electrolyte layer 421, the second material layer 422 and a control electrode layer 430 in FIG. 5 are substantially the same as the channel 110, the first, second, third and fourth channel wall parts 120a, 120b, 120c, 120d, the electrolyte layer 121, the second material layer 122 and the control electrode layer 130 described above, and therefore will not be repeated in the present disclosure.

Figure 6:
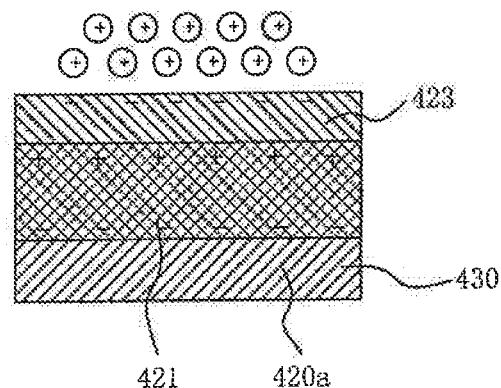
FIG. 6 is an enlarged view of a part indicated by a dotted box in FIG. 5.

FIG. 6 is an enlarged view of a part indicated by a dotted box in FIG. 5. The following description will be made by taking a positive voltage being applied to the control electrode layer 430 as an example. In an operation, in the case where the positive voltage is applied to the control electrode layer 430, anions (i.e., ions or ionic groups with negative charges) in the electrolyte layer 421 are gathered at a side of the electrolyte layer 421 close to the control electrode layer 430 under the action of the positive voltage of the control electrode layer 430, and cations (i.e., ions or ionic groups with positive charges) in the electrolyte layer 421 are gathered at a side of the electrolyte layer 421 away from the control electrode layer 430 under the action of the positive voltage of the control electrode layer 430. These positive charges gathered at the side of the electrolyte layer 421 away from the control electrode layer 430 will generate an electric field.

As shown in FIG. 6, in the case where the liquid sample in the channel 410 has charges which may move freely or the liquid sample is polar liquid, negative surface charges will be gathered at a side of the third material layer 423 close to the channel 410 (i.e., a side of the third material layer 423 away from the control electrode layer 430). Due to the action of the positive voltage applied to the control electrode layer 430, the cations gathered at the side of the electrolyte layer 421 away from the control electrode layer 430 are much more than the negative surface charges gathered at the side of the third material layer 423 close to the channel 410, and as a whole, positive charges exist at the surface of the electrolyte layer 421 to be in contact with the liquid sample. Therefore, a repelling effect of the cations gathered at the side of the electrolyte layer 421 away from the control electrode layer 430 on the positive charges in the liquid sample in the channel 410 is much greater than an attraction effect of the negative surface charges gathered at the side of the third material layer 423 close to the channel 410 on the positive charges in the liquid sample in the channel 410, and the positive charges or polar liquid molecules in the liquid sample in the channel 410 will be repelled, thus changing charge distribution in the liquid sample in the channel 110 410 and changing a physical property (for example, viscosity) of the fluid correspondingly, thereby manipulating the liquid sample, for example, achieving opening and closing the channel.

Furthermore, in the case where the electric signal with a constant voltage is applied to the control electrode layer 430, the charge distribution in the liquid sample in the channel 410 may be changed by adjusting an ion density in the electrolyte material of the electrolyte layer 421. In some embodiments, in the case where the electrolyte layer 421 is made of a liquid electrolyte, a concentration of the liquid electrolyte may be adjusted to adjust an intensity of the electric field acting on the charges in the liquid sample in the channel 410. For example, the concentration of the liquid electrolyte may be increased to increase the intensity of the electric field acting on the charges in the liquid sample in the channel 410.

Similarly, since the electrolyte layer 421 is made of an electrolyte material, the intensity of the electric field acting on the charges in the liquid sample in the channel 410 may be increased, thereby reducing the voltage of the electric signal required to realize fluid control and applied to the control electrode layer 430, and improving the influence of the voltage on the charge distribution in the liquid sample in the channel 410, a fluid control effect and a detection and sensing precision.

In some embodiments, the microfluidic channel may further include a base substrate at which the control electrode layer is located, and a channel structure is located at a side of the control electrode layer away from the base substrate. That is; the base substrate is configured to support elements located thereon, including the control electrode layer, the channel structure, or the like.

Figure 7:
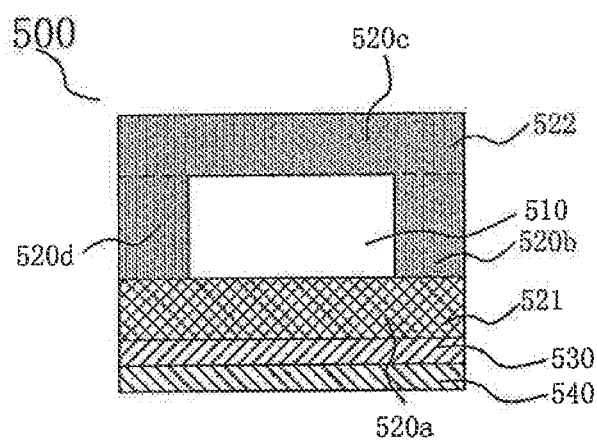
FIG. 7 is a schematic structural diagram of a microfluidic channel according to at least one embodiment of the present disclosure.

As shown in FIG. 7, a microfluidic channel 500 according to some embodiments of the present disclosure may include a channel structure and a control electrode layer 530. The channel structure includes a channel 510 for a liquid sample to flow and a channel wall surrounding the channel 510. A first channel wall part 520a of the channel wall includes an electrolyte layer 521 made of an electrolyte material. The microfluidic channel 500 further includes a base substrate 540, and the channel structure is located at a side of the control electrode layer 530 away from the base substrate 540. The base substrate 540 may be made of a rigid or flexible material. For example, the base substrate 540 may be made of glass, ceramic, silicon, polyimide, combinations thereof, or the like.

The channel 510, the first channel wall part 520a, a second channel wall part 520b, a third channel wall part 520c, a fourth channel wall part 520d, the electrolyte layer 521 and the control electrode layer 530 in FIG. 7 are substantially the same as the channel 110, the first, second, third and fourth channel wall parts 120a, 120b, 120c, 120d, the electrolyte layer 121 and the control electrode layer 130 described above, and therefore will not be repeated in the present disclosure. It should be understood that the embodiment shown in FIG. 7 is only exemplary.

However, although not shown, any microfluidic channel according to the embodiments of the present disclosure including, but not limited to, the above-mentioned microfluidic channels 100, 200, 300, 400, may each include the base substrate.

Furthermore, it should be understood that other functional elements may be further formed at the above-mentioned base substrate, for example, a drive circuit for providing the electric signal to the control electrode layer, and the drive circuit may be formed at the base substrate by a sputtering process, an etching process, or the like, or be prepared as an independent drive chip and then combined onto the base substrate by a bonding (bonding) process. According to actual requirements, a structure, such as a buffer layer, or the like, may be further formed at the base substrate, and then other functional structures (for example, the control electrode layer, the electrolyte layer, the drive circuit, or the like) are formed at the buffer layer.

In some embodiments, the control electrode layer in the microfluidic channel may include a first electrode part and a second electrode part located at opposite sides of the channel.

Figure 8:
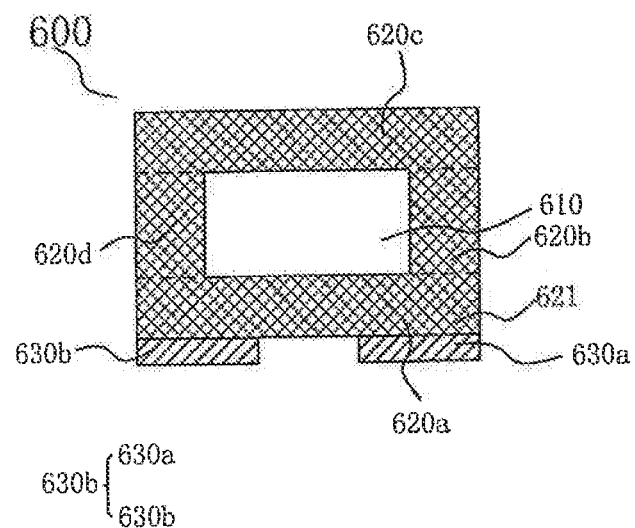
FIG. 8 is a schematic structural diagram of a microfluidic channel according to at least one embodiment of the present disclosure.

As shown in FIG. 8, a microfluidic channel 600 according to some embodiments of the present disclosure includes a control electrode layer 630 including a first electrode part 630a and a second electrode part 630b located at opposite sides of the channel 610. For example, the first and second electrode parts 630a, 630b are both strip-shaped electrodes, and extension directions thereof are the same as an extension direction of the channel 610 at least partially to sandwich the channel 610 sandwiched between the two electrode parts.

In an operation, an electric signal is provided to the first and second electrode parts 630a, 630b, so as to control a liquid sample flowing in the channel 610, for example, concentration, filtering, separation, or the like, of the liquid sample. The first and second electrode parts 630a, 630b may be both made of any proper material, for example, metal, alloy, indium tin oxide (ITO), or the like, and may be made of the same or different materials, which is not limited in the embodiments of the present disclosure.

Figure 9A:
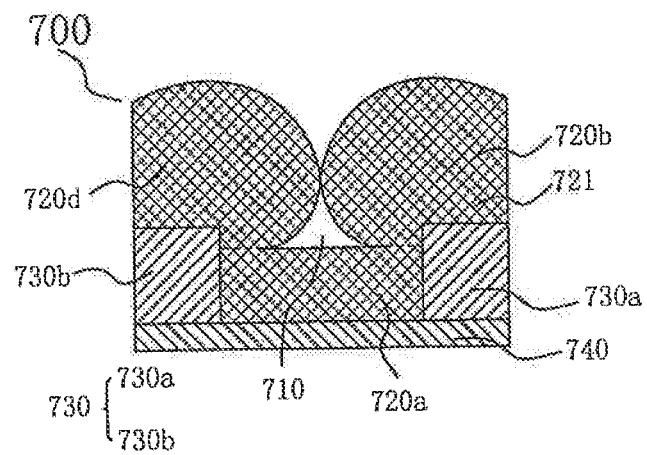
FIG. 9A is a schematic structural diagram of a microfluidic channel according to at least one embodiment of the present disclosure.
Figure 9B:
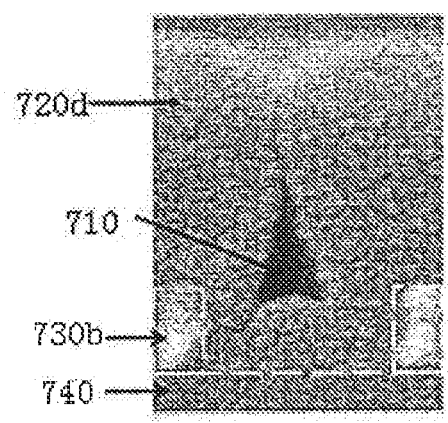
FIG. 9B is a scanning tunneling microscope view of the microfluidic channel shown in FIG. 9A.

As shown in FIG. 9A, a microfluidic channel 700 according to some embodiments of the present disclosure includes a control electrode layer 730 located on a base substrate 740 and including a first electrode part 730a and a second electrode part 730b located at opposite sides of a channel 710. In FIG. 9A, a channel wall surrounding the channel 710 may include a first channel wall part 720a, a second channel wall part 720b, and a fourth channel wall part 720d, without including a third channel wall part 720c. The channel wall includes an electrolyte layer 721 made of an electrolyte material and including a first part (for example, a part of the electrolyte layer 721 corresponding to the second channel wall part 720b) located at the first electrode part 730a and a second part (for example, a part of the electrolyte layer 721 corresponding to the fourth channel wall part 720d) located at the second electrode part 730b, and the first and second parts extend obliquely towards and come into contact with each other, thereby providing a self-closed structure. The channel 710 is defined between the first and second parts. FIG. 9B shows a scanning electron microscope (SEM) picture of the microfluidic channel 700 shown in FIG. 9A. As shown in FIGS. 9A and 9B, the self-closed channel has a substantially triangular cross section.

In some embodiments, with respect to the base substrate 740, the first and second electrode parts 730a, 730b may be higher than a bottom surface of the channel 710, so that electric fields provided by the first and second electrode parts 730a, 730b better act on a liquid sample of the channel 710. The channels 610, 710, the first channel wall parts 620a, 720a, the second channel wall parts 620b, 720b, a third channel wall part 620c, the fourth channel wall parts 620d, 720d, the electrolyte layers 621, 721 and the control electrode layers 630, 730 in FIGS. 8 and 9A are substantially the same as the channel 110, the tint, second, third and fourth channel wall parts 120a, 120b, 120c, 120d, the electrolyte layer 121 and the control electrode layer 130 described above, the base substrate 740 may be substantially the same as the above-mentioned base substrate 540, and therefore, description will not be repeated in the present disclosure.

It should be understood that the embodiments of FIGS. 8 and 9A are only exemplary, and in any microfluidic channel according to the embodiments of the present disclosure including, but not limited to, the above-mentioned microfluidic channels 100, 200, 300, 400, 500, the control electrode layer may include the first and second electrode parts located at opposite sides of the channel.

In some embodiments, the microfluidic channel may further include a cover plate located at a side of the channel structure to define the channel partially. For example, the third channel wall part (for example, the third channel wall parts 120c, 220c, 320c, 420c, 520c, 620c) in any one of the above-mentioned embodiments may be formed as an independent element separated from the second and fourth channel wall parts, thereby serving as the cover plate and defining the channel together with the first, second and fourth channel wall parts. Alternatively, the second or fourth channel wall part in any one of the above-mentioned embodiments may be configured as an independent element and serve as the cover plate, or any combination of the second, third and fourth channel wall parts in any one of the above-mentioned embodiments may serve as the cover plate.

The electrolyte material of the electrolyte layer in the embodiments of the present disclosure may include at least one of: an inorganic electrolyte material, a multimer or polymer electrolyte material, or ionic liquid or ionic gel. For example, in some embodiments, the electrolyte layers 121, 221, 321, 421, 521, 621, 721 may be each made of at least one of: an inorganic electrolyte material, a multimer or polymer electrolyte material, or ionic liquid or ionic gel. Furthermore, in the case where the microfluidic channel according to the embodiments of the present disclosure includes the electrolyte layer and the third material layer and the electrolyte layer is located at a side of the third material layer away from the channel, the electrolyte layer may be made of a liquid electrolyte material. In this case, the channel structure of the microfluidic channel may include a hole structure to accommodate the liquid electrolyte material, thereby forming the electrolyte layer. For example, in some exemplary embodiments, a gap may be formed between the third material layer and other layers (for example, the control electrode layer) to accommodate the liquid electrolyte material, thereby forming the electrolyte layer. A spacer may be provided in the gap to define the gap. For example, in some embodiments, the electrolyte layer 421 may be made of the liquid electrolyte material.

For example, the multimer or polymer electrolyte material may include: polyethylene oxide (polyethylene oxide, PEO)/LiClO$_4$ in which Li$^+$ ions and ClO$_4^-$ ions are distributed in a polymer matrix and may migrate under the action of the electric field; PEO/KClO$_4$ in which K$^+$ ions and ClO$_4^-$ ions are distributed in a polymer matrix and may migrate under the action of the electric field; poly(styrene-sulfonic acid) (poly(styrene-sulfonic acid), PSSH); poly(vinylphosplionic acid-co-acrylic acid) (poly(vinylphosphonic acid-co-acrylic acid), P(VPA-AA)); poly [9,9-bis(3'-((N,N-dimethyl)-N-ethylammonium)propyl)-2,7-fluorene)-alt-2,7-(9,9-dioctylfluorene)]dibromide (poly [9,9-bis(3'-((N,N-dimethyl)-N-ethylamin onium)propyl)-2,7-tluorene)-alt-2,7-(9,9-dioctylfluorene)]dibromide, PFNBr); poly(vinylidenefluoride-co-trifluoroethylene)-poly (vinylphosphonic acid-co-acrylic acid) (poly(vinylidenefluoride-co-trifluoroethylene)-poly (vinylphosphonic acid-co-acrylic acid), P(VDF-TrFE)-P (VPA-AA)); poly(allylaminehydrochloride)-sodiumpolystyrene sulfonate (poly(allylaminehydrochloride)-sodiumpolystyrene sulfonate, PAH-PSS), or the like.

For example, the ionic liquid or ionic gel may include: 1-ethyl-3methylimidazolium bis(fluorosulfonyl)imide (1-ethyl-3methylimidazolium bis(floorosulfonyl)imide, EMIFSI); methylimidazolium bis(trifluoromethylsulfonyl) imide (methylimidazolium bis(trifluoromethanesulfonyl) imide, EMITFSI); 1-ethyl-3-methylimidazorium bis(trifluoromethylsulfonyl)inaide (1-ethyl-3-methylimidazorium bis (trifluoromethylsulfonyl)imide, emimTFSI); N,N-diethyl-N-(2-methoxyethyl)-N-methylammonium bis (trifluoromethylsulfonyl)-imide (N,N-diethyl-N-(2-mnethoxyethyl)-N-methylammonium bis (trifluoromethylsulfonyl)-imide, DEME-TFSI); 1-butyl-3-methylimidazolium hexafluorophosphate (1-butyl-3-methylimidazolium hexafluorophosphate, BmimPF$_6$); 1-ethyl-3-methylimidazolium tetracyanoborate (1-ethyl-3-methylimidazolium tetracyanoborate, [EMM][TCB]), or the like. The ionic liquid or ionic gel may have faster ion diffusivity and ion mobility than the multimer or polymer electrolyte material.

In the case where the electrolyte layer is made of the ionic liquid or ionic gel, the ionic liquid or ionic gel and the materials of other adjacent layers cannot dissolve each other. For example, hydrophilic ionic liquid or ionic gel is adjacent to an oil-based material.

For example, the inorganic electrolyte material may include a porous oxide material, a zeolite (zeolite) material, ytttria-stabilized zirconia (ytttria-stabilized zirconia, YSZ), or the like. The porous oxide material may include porous silica, porous silica/calcium chloride, porous silica/lithium chloride, nanoparticle alumina, nanoparticie silica, or the like. The inorganic electrolyte material has better chemical stability than and similar conductivity to the multimer or polymer electrolyte material and the ionic liquid or ionic gel.

Figure 10:
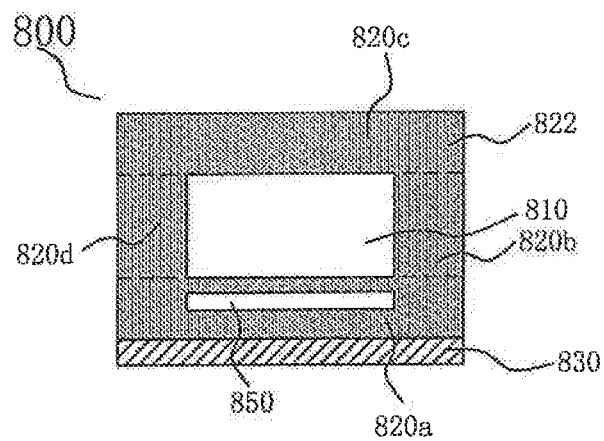
FIG. 10 is a schematic structural diagram of a microfluidic channel according to at least one embodiment of the present disclosure.

As shown in FIG. 10, a microfluidic channel 800 according to at least one embodiment of the present disclosure includes a channel structure including a channel 810 for a liquid sample to flow and a channel wall surrounding the channel 810. Exemplarily, the channel wall surrounding the channel 810 includes a first channel wall part 820a, a second channel wall part 820b, a third channel wall part 820c and a fourth channel wall part 820d each including a second material layer 822. Exemplarily, the first channel wall part 820a includes a hole structure 850 to accommodate a liquid electrolyte material, thereby forming an electrolyte layer. The hole structure 850 may be formed by an etching process, an excavating process, or the like. An extension direction of the hole structure 850 is the same as that of the channel 810 at least partially, and a projection of the hole structure 850 on a control, electrode layer 830 overlaps with that of the channel 810 on the control electrode layer 830. The second, third and fourth channel wall parts 820b, 820c, 820d include a second material layer 822. The channel 810, the first, second, third and fourth channel wall parts 820a, 8201, 820c, 820d and the control electrode layer 830 in FIG. 10 are substantially the same as the channel 110, the first, second, third and fourth channel wall parts 120a, 120b, 120c, 120d and the control electrode layer 130 described above, and therefore will not be repeated in the present disclosure.

In some embodiments, the electrolyte layer may be formed by providing ionic liquid or ionic gel in the hole structure 850. For example, the ionic liquid or ionic gel may include: 1-ethyl-3methylimidazolium bis(fluorosulfonyl) imide (1-ethyl-3methylimidazolium bis(fluorosulfonyl)imide, EMIFSI), methylimidazorium bis(trifluoromethylsulfonyl)imide (methylimidazolium bis(trifluoromethylsulfonyl) imide, EMITFSI), 1-ethyl-3-methylimidazorium bis (trifluoromethylsulfonyl)imide (1-ethyl-3-methylimidazorium bis(trifluoromethylsulfonyl)imide, emimTFSI), N,N-diethyl-N-(2-methoxyethyl)-N-methyl-ammonium bis(trifluoromethylsulfonyl)-imide (N,N-diethyl-N-(2-methoxyethyl)-N-methylammonium bis(trifluoromethylsulfonyl)-imide, DEME-TFSI), 1-butyl-3-methylimidazolium hexafluorophosphate (1-butyl-3-methylimidazolium hexafluorophosphate, $BmimPF_6$), 1-ethyl-3-methylimidazolium tetracyanoborate (1-ethyl-3-methylimidazolium tetracyanoborate, [EMIM][TCB], or the like. Furthermore, it should be understood that the electrolyte layer may also be made of combinations of plural electrolyte materials.

Some embodiments of the present disclosure further provide a microfluidic device including the microfluidic channel according to any one of the above-mentioned embodiments. For example, the microfluidic device may be configured for operations, such as separation, detection, power generation, or the like. According to actual requirements, the microfluidic device may further include a fluid inlet, a fluid outlet, an electrical terminal, an optical terminal, a communication interface, or the like, to be connected with a liquid source, a power source, a light source, a data storage device, or the like, which is not limited in the embodiments of the present disclosure.

Figure 11:
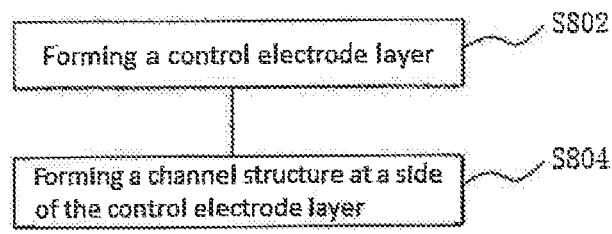
FIG. 11 is a schematic flow chart of a method of preparing a microfluidic channel according to at least one embodiment of the present disclosure.

Some embodiments of the present disclosure further provide a method of preparing the microfluidic channel according to any one of the above-mentioned embodiments. As shown in FIG. 11, the method of preparing the microfluidic channel according to some embodiments of the present disclosure may include:

S802, forming a control electrode layer;

S804, forming a channel structure at a side of the control electrode layer, wherein the channel structure includes a channel for a liquid sample to flow and a channel wall including an electrolyte layer made of an electrolyte material, and the control electrode layer is located at a side of the electrolyte layer away limn the channel and overlaps with the electrolyte layer with respect to the channel.

It should be noted that there are no requirements on the order of the above-mentioned steps S802 and S804. That is, the channel structure may be formed, and the control electrode layer is formed at a side of the channel structure.

The control electrode layer may be made of any proper electrically conductive material, for example, a single metal, an alloy, a conductive organic material (such as polyimide, or the like), a conductive oxide (such as indium tin oxide (ITO), indium zinc oxide (IZO), or the like), or the like.

FIGS. 12(a) to 12(d) show a process of forming a channel structure at a a.ontrol electrode layer according to some embodiments of the present disclosure.

Figure 12:
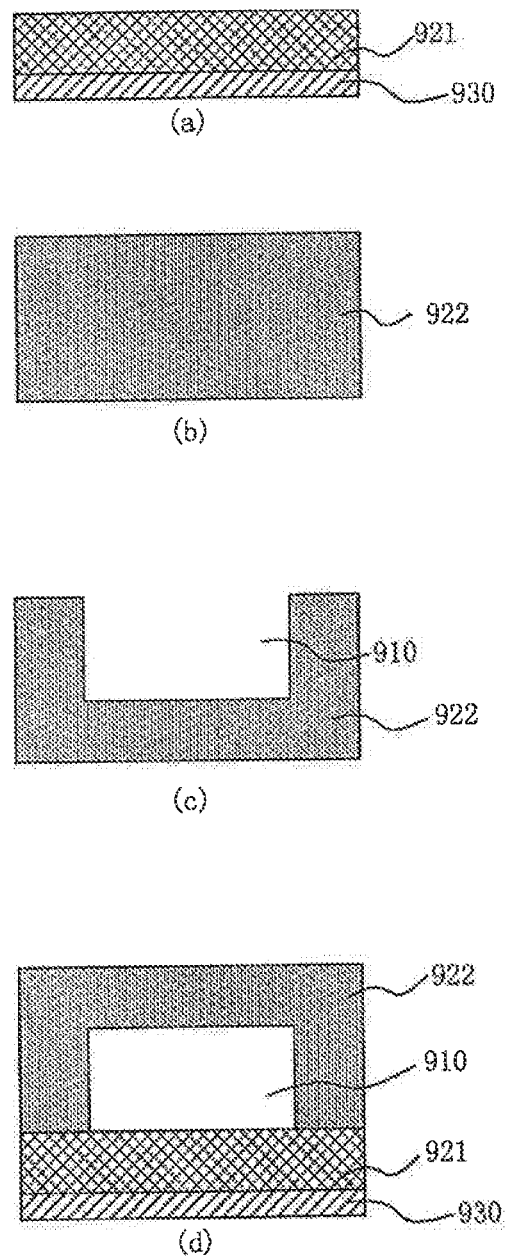
FIG. 12 is a process of forming a channel structure at a control electrode layer according to at least one embodiment of the present disclosure.

As shown in FIG. 12(a), an electrolyte layer 921 is formed on the control electrode layer 930, wherein the electrolyte layer 921 may be pre-prepared or formed at the control electrode layer 930 directly by a sputtering process, or the like; as shown in FIG. 12(b), a second material layer 922 is provided, wherein the second material layer 922 is an example of the first wall layer in the embodiments of the present disclosure; as shown in FIG. 12(c), a groove 910 is formed in the second material layer 922; and as shown in FIG. 12(d), the second material layer 922 formed with the groove 910 is aligned and combined with the electrolyte layer 921 by, for example, a adhering process, or the like, to obtain a microfluidic channel, wherein the groove 910 serves as a channel for a liquid sample to flow. The electrolyte layer 921, the second material layer 922 and the control electrode layer 930 may be the same as any above-mentioned electrolyte layer, second material layer and control electrode layer, and are not repeated in the disclosure.

Furthermore, it should be understood that FIGS. 12(a) to 12(d) only show an exemplary implementation in which the channel structure is formed on the control electrode layer; however, the embodiments of the present disclosure are not limited thereto. For example, in some embodiments, the groove may also be formed in the electrolyte layer, then a cover plate is formed on the electrolyte layer formed with the groove, and the groove is used as the channel for the liquid sample to flow.

In some embodiments, the step S802 of forming the control electrode layer may include forming a first electrode part and a second electrode part which are spaced apart from each other. Therein the first and second electrode parts are located at opposite sides of the channel. Moreover, the step S804 of forming the channel structure on the control electrode layer may include forming the electrolyte layer on the first and second electrode parts, and enabling a first part of the electrolyte layer located on the first electrode part to contact a second part of the electrolyte layer located on the second electrode layer, so as to define the channel. For example, referring to FIG. 9A, the first electrode part 730a and the second electrode part 703b are formed on the base substrate 740, and then the electrolyte layer 721 is formed on the first electrode part 730a and the second electrode part 703b, for example, to obtain the self-closed channel.

In some embodiments, the first and second parts of the electrolyte layer may be formed on the first and second electrode parts by a sputtering process, plasma enhanced chemical vapor deposition (TECVD), atomic layer deposition (ALD) or the like, and materials of the first and second parts of the electrolyte layer grow oppositely during deposition, thus coming into contact with each other and obtaining the triangular self-closed channel as shown in FIGS. 9A and 9B, for example. The embodiments of the present disclosure do not limit the material deposition method and are also not limited to forming the self-closed channel. The channel is defined by the first and second parts of the electrolyte layer contacting each other, thereby simplifying the process of preparing the microfluidic channel and saving time and costs.

In some embodiments, the step S804 of forming the channel structure at the control electrode layer may include:

forming the electrolyte layer on the control electrode layer;

forming a third material layer on the electrolyte layer, wherein a material of the third material layer is different from the electrolyte material of the electrolyte layer; and forming the channel in the third material layer.

Figure 13:
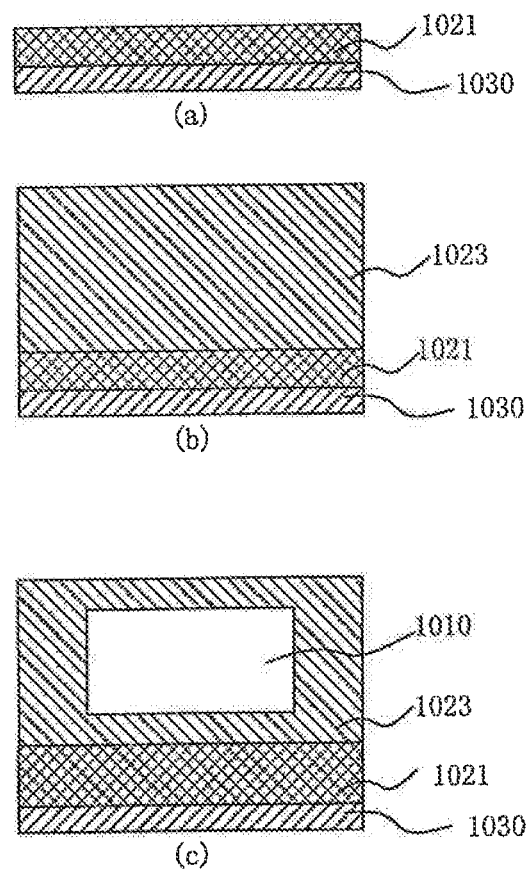
FIG. 13 is a process of forming a channel structure at a control electrode layer according to at least one embodiment of the present disclosure.

FIGS. 13(a) to 13(c) show a process of forming a channel structure at a control electrode layer according to some embodiments of the present disclosure.

As shown in FIG. 13(a), an electrolyte layer 1021 is formed at the control electrode layer 1030, wherein the electrolyte layer 1021 may be pre-prepared or formed at the control electrode layer 1030 directly by a sputtering process, or the like; as shown an FIG. 13(b), a third material layer 1023 is formed on the electrolyte layer 1021, wherein the third material layer 1023 is an example of the second wall layer in the embodiments of the present disclosure, and the third material layer 1023 may be pre-prepared or formed on the electrolyte layer 1021 directly by a sputtering process, or the like; and as shown in FIG. 13(e), a channel 1010 for a liquid sample to flow is formed in the third material layer 1023 by an etching process, an excavating process, or the like, so as to obtain a microfluidic channel. The electrolyte layer 1021, the third material layer 1023 and the control electrode layer 1030 may be the same as any above-memioned electrolyte layer, third material layer and control electrode layer, and ace not repeated in, the disclosure.

Furthermore, it should be understood that FIGS. 13(a) to 13(e) only show an exemplary implementation in which the channel structure is formed on the control electrode layer; however, the embodiments of the present disclosure are not limited thereto. For example, a groove with a side away from the electrolyte layer 1021 opened may be formed in the third material layer 1023 first, and then another third material layer covering the groove is provided to obtain the microfluidic channel.

In some embodiments, the method of preparing the microfluidic channel according to the embodiments of the present disclosure may further include: providing a base substrate, wherein the control electrode layer is formed on the base substrate, and the channel structure is formed on the control electrode layer. The base substrate may be made of a rigid or flexible material. For example, the base substrate may be made of glass, ceramic, silicon, polyimide, combinations thereof, or the like.

Furthermore, in the case where the microfluidic channel according to the embodiments of the present disclosure includes the electrolyte layer and the third material layer and the electrolyte layer is located at a side of the third material layer away from the channel, the electrolyte layer may be made of a liquid electrolyte material. In this case, the method of preparing the microfluidic channel according to some embodiments of the present disclosure may further include: forming a hole in the channel wall, and accommodating the electrolyte material in the hole to obtain the electrolyte layer. For example, in some exemplary embodiments, a gap may be formed between the third material layer and other layers (for example, the control electrode layer) to accommodate the liquid electrolyte material, thereby forming the electrolyte layer. A spacer may be provided in the gap to define the gap.

For the embodiments of the above-mentioned preparation method, the electrolyte material of the electrolyte layer may include at least one of: an inorganic electrolyte material, a multirner or polymer electrolyte material, or ionic liquid or ionic gel, and examples thereof may refer to the description of the embodiments of the above-mentioned microfluidic channel, and are not repeated in the present disclosure. Furthermore, it should be understood that the electrolyte layer may be made of combinations of plural electrolyte materials.

At least one embodiment of the present disclosure further provides an operation method for any one of the above-mentioned microfluidie channels, including: providing an electric signal to the control electrode layer to control a liquid sample flowing in a channel.

In some embodiments, the control electrode layer is coupled to a control circuit or controller, and thus the controller or control circuit provides a voltage signal to the control electrode layer to control the liquid sample flowing in the channel, for example, concentration, filtering, separation, or the like, of the liquid sample.

In some embodiments, according to the type of the liquid sample flowing in the channel and operation requirements, a positive voltage signal or negative voltage signal may be provided to the control electrode layer, thus controlling the liquid sample flowing in the channel, for example, concentration, filtering, separation, or the like, of the liquid sample, At least one embodiment of the present disclosure further provides a method of preparing a microfluidic device, including:

forming a control electrode layer;

forming a channel structure at a side of the control electrode layer, wherein the channel structure includes a channel for a liquid sample to flow and a channel wall including an electrolyte layer made of an electrolyte material, and the control electrode layer is located at a side of the electrolyte layer away from the channel and overlaps with the electrolyte layer with respect to the channel.

Detailed description of the method of preparing the rnicrotluidic device may refer to the description of the method of preparing the inicrofluidic channel above.

What are described above are related to the illustrative embodiments of the disclosure only and not limitative to the scope of the disclosure; the scopes of the disclosure are defined by the accompanying claims.

What is claimed is:

1. A microfluidic channel, comprising:
   a channel structure, comprising a channel for a liquid sample to flow through and a channel wall surrounding the channel, wherein the channel wall comprises an electrolyte layer made of an electrolyte material; and
   a control electrode layer, at a side of the electrolyte layer away from the channel and overlapping with the electrolyte layer with respect to the channel.

2. The microfluidic channel according to claim 1, wherein the electrolyte layer is exposed in the channel to be allowed to be in contact with the liquid sample in an operation.

3. The microfluidic channel according to claim 1, wherein the electrolyte layer surrounds a part of the channel.

4. The microfluidic channel according to claim 1, wherein the channel wall further comprises a first wall layer,
   the first wall layer is exposed in the channel to be allowed to be in contact with the liquid sample in an operation, and a material of the first wall layer is different from the electrolyte material of the electrolyte layer.

5. The microfluidic channel according to claim 1, wherein the channel wall further comprises a second wall layer,
   the electrolyte layer s at a side of the second wall layer away from the channel, and a material of the second wall layer is different from the electrolyte material of the electrolyte layer.

6. The microfluidic channel according to claim 1, further comprising a base substrate, wherein the control electrode layer is on the base substrate, and the channel structure is at a side of the control electrode layer away from the base substrate.

7. The microfluidic channel according to claim 1, wherein the control electrode layer comprises a first electrode part and a second electrode part at opposite sides of the channel.

8. The microfluidic channel according to claim 7, wherein the electrolyte layer comprises a first part on the first electrode part and a second part on the second electrode part, and the first part is in contact with the second part to define the channel therebetween.

9. The microfluidic channel according to claim 1, further comprising a cover plate,
   wherein the cover plate is at a side of the channel structure to partially define the channel.

10. The microfluidic channel according to claim 1, wherein the electrolyte material comprises an inorganic electrolyte material or a polymer electrolyte material.

11. The microfluidic channel according to claim 5, wherein the electrolyte material is liquid, and the channel structure comprises a hole structure configured to be allowed to accommodate the electrolyte material in an operation to form the electrolyte layer.

12. A method of preparing a microfluidic channel, comprising:
   forming a control electrode layer; and forming a channel structure on the control electrode layer, wherein the channel structure comprises a channel for a liquid sample to flow and a channel wall comprising an electrolyte layer made of an electrolyte material, and the control electrode layer is at a side of the electrolyte layer away from the channel and overlaps with the electrolyte layer with respect to the channel.

13. The method according to claim 12, wherein the electrolyte layer is exposed in the channel to be allowed to be in contact with the liquid sample in an operation.

14. The method according to claim 13, wherein the electrolyte layer surrounds the channel.

15. The method according to claim 12, wherein
the forming the control electrode layer comprises:
    forming a first electrode part and a second electrode part which are spaced apart, wherein the first and second electrode parts are at opposite sides of the channel;
the forming the channel structure on the control electrode layer comprises:
    forming the electrolyte layer on the first and second electrode parts, and enabling a first part of the electrolyte layer on the first electrode part to be in contact with a second part of the electrolyte layer on the second electrode layer to define the channel.

16. The method according to claim 12, wherein the forming the channel structure on the control electrode layer comprises:
    forming the electrolyte layer on the control electrode layer;
    forming a second wall layer on the electrolyte layer, wherein a material of the second wall layer is different from the electrolyte material of the electrolyte layer; and
    forming the channel in the second wall layer.

17. The method according to claim 12, further comprising:
    providing a base substrate,
    wherein the control electrode layer is formed on the base substrate, and the channel structure is formed on the control electrode layer.

18. The method according to claim 12, wherein the electrolyte material comprises a solid inorganic electrolyte material or a solid polymer electrolyte material.

19. The method according to claim 16, wherein the electrolyte material is liquid, and the method further comprises:
    forming a hole structure in the channel wall, and accommodating the electrolyte material in the hole structure to obtain the electrolyte layer.

20. An operation method of a microfluidic channel, the microfluidic channel comprising:
    a channel structure, comprising a channel for a liquid sample to flow through and a channel wall surrounding the channel, wherein the channel wall comprises an electrolyte layer made of an, electrolyte material; and
    a control electrode layer, at a side of the electrolyte layer away from the channel and overlapping with the electrolyte layer with respect to the channel,
    wherein the operation method comprises:
    providing an electric signal to the control electrode layer to control the liquid sample flowing in the channel.

* * * * *